United States Patent [19]

Solomon et al.

[11] Patent Number: 6,161,165

[45] Date of Patent: *Dec. 12, 2000

[54] HIGH PERFORMANCE DATA PATH WITH XOR ON THE FLY

[75] Inventors: Robert C. Solomon, Kensington, N.H.; Brian K. Bailey, Shrewsbury, Mass.; Robert Yates, Sutton, Mass.; Peter Everdell, Littleton, Mass.; Elizabeth H. Reeves, Westboro, Mass.

[73] Assignee: EMC Corporation, Hopkinton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/815,193

[22] Filed: Mar. 11, 1997

Related U.S. Application Data

[63] Continuation-in-part of application No. 08/749,312, Nov. 14, 1996.

[51] Int. Cl.[7] ............................ G06F 12/00; G06F 13/38
[52] U.S. Cl. ......................... 711/114; 711/112; 711/165; 710/129
[58] Field of Search ................................. 711/114, 165, 711/112; 395/182.04, 182.05; 371/40.11, 40.14; 710/126–129; 714/7–8

[56] References Cited

U.S. PATENT DOCUMENTS

| | | | |
|---|---|---|---|
| 4,761,785 | 8/1988 | Clark et al. | 714/6 |
| 5,146,588 | 9/1992 | Crater et al. | 395/575 |
| 5,163,132 | 11/1992 | DuLac et al. | 395/275 |
| 5,191,584 | 3/1993 | Anderson | 371/51.1 |
| 5,257,391 | 10/1993 | DuLac et al. | 395/800 |
| 5,335,235 | 8/1994 | Arnott | 371/49.2 |
| 5,345,565 | 9/1994 | Jibbe et al. | 395/325 |
| 5,396,620 | 3/1995 | Burghart et al. | 395/575 |
| 5,537,567 | 7/1996 | Galbraith et al. | 395/441 |
| 5,588,122 | 12/1996 | Garcia | 395/250 |
| 5,708,668 | 1/1998 | Styczinski | 1/1 |
| 5,721,839 | 2/1998 | Callison et al. | 395/308 |
| 5,737,744 | 4/1998 | Callison et al. | 711/114 |
| 5,737,745 | 4/1998 | Matsumoto et al. | 711/114 |
| 5,748,911 | 5/1998 | Maguire et al. | 395/281 |
| 5,765,183 | 6/1998 | Kojima et al. | 711/114 |
| 5,771,359 | 6/1998 | Galloway et al. | 710/128 |
| 5,809,280 | 9/1998 | Chard et al. | 711/160 |
| 5,903,906 | 5/1999 | Pettey | 711/118 |
| 5,937,174 | 8/1999 | Weber | 711/113 |
| 5,950,225 | 9/1999 | Kleiman | 711/111 |

FOREIGN PATENT DOCUMENTS

| | | |
|---|---|---|
| 0427119A2 | 5/1991 | European Pat. Off. . |
| 0529557A2 | 3/1993 | European Pat. Off. . |
| 0727750A2 | 8/1996 | European Pat. Off. . |
| 0740247A2 | 10/1996 | European Pat. Off. . |

OTHER PUBLICATIONS

"Channel Networking: Networking Flexibility with Channel Speeds Using . . . ", Fibre Channel. http://www.ancor.com/chnlnet.htm.

Meltek FC–Array, Product Description. http://www.meltek.com/fibre/fca.html.

*Primary Examiner*—John W. Cabeca
*Assistant Examiner*—Pierre-Michel Bataille
*Attorney, Agent, or Firm*—Bromberg & Sunstein LLP

[57] ABSTRACT

A high performance data path for performing XOR on the fly. A first memory is connected to a first bus and a second memory is connected to a second bus selectively coupled to the first bus. Logic for performing an XOR can be switched into connection with the first and second bus for XORing data in a buffer with the data passed from one of the memories to the other memory. The result is replaced into the buffer to permit successive XORing. When reading from an interrelated group of disks such as a RAID 3 group, the data path permits an N–1 and go mode in which a read does not wait for data from the last disk to retrieve its data sector. If the last disk contains data (as opposed to parity) the data is obtained from the XORed data in the XOR buffer of the high performance data path. For writing data, the XOR on the fly generates the parity sector for writing at the completion of a write to an interrelated group of disks.

31 Claims, 4 Drawing Sheets

HIGH PERFORMANCE DATA PATH WITH XOR ON THE FLY

This application is a continuation-in-part of copending U.S. patent application Ser. No. 08/749,312, filed Nov. 14, 1996, assigned to the assignee of the present invention. The full disclosure of the parent patent application is hereby incorporated by reference herein. This invention relates to high availability disk arrays for use in data processing systems and more particularly, to a high performance data path for accommodating validity and error checking while maintaining an acceptable and reliable throughput during disk access operations.

BACKGROUND OF THE INVENTION

The bottleneck of many systems and their applications is located at the I/O level. Applications are demanding more and more speed and bandwidth from their data storage products. In addition to speed, an application such as Video on Demand (VOD), needs its disk accesses to be timely both in terms of speed and interval. That is, the requirement for VOD is that of high bandwidth without interruption. Specifically, the speed required for VOD must be sustained without interruption—resulting in uninterrupted movie clips.

Disk array systems have been developed to provide high availability and reliability. In particular, systems known as Redundant Array of Inexpensive Disks (RAID) provide resilience to disk failure through the use of multiple disks and data distribution and correction techniques. Unfortunately, the techniques for increasing reliability often result in slowing down an I/O operation.

It is desirable to devise systems and techniques for maintaining the reliability of RAID systems and at the same time increasing their speed.

SUMMARY OF THE INVENTION

The present invention is directed to a high performance data path for use in particular in a RAID controller. The high performance data path permits accelerated methods for reading and writing data to an array of disks implementing an XOR based parity system. The high performance data path includes a first bus and a second bus that are switchably interconnected. A first memory resides on the first bus and a second memory resides on the second bus. An XOR engine is switchably connectable to the first and second buses. The XOR engine is used to XOR data that is passed between the first and second memories across the first and second buses with data in a buffer and placing the result back into the buffer. Of the two memories, one may be referred to as a host-side memory and the other a disk-side memory. The host-side memory stages data for a write and the disk-side memory stages data received from the disks to complete a read. The two memories may also advantageously be used as caches.

The high performance data path is useful in performing both reads and writes of data to a redundant array of disks. Groups of disks are interrelated in that a sector in one of the disks corresponds with a sector in each of the other disks in the group. The sector of one of the disks in the group holds parity comprised of the results of XORing corresponding words in the corresponding data sectors. When a read from the disks is performed over the high performance data path, an XOR of corresponding words may be performed on the fly, i.e., as data is moved past the XOR engine. Taking advantage of this, it is possible to deliver the data to a host computer before all of the disks have responded to the read. The missing data from the final disk is essentially reconstructed on the fly in the XOR engine. The write operation to the disks is also accelerated in that as data is moved from the staging area in the host-side memory to the disk-side memory which are separately provided in the high performance data path, they are simultaneously XORed in the XOR engine. Thus, upon completion of the movement of the data from host-side memory to the disk-side memory, the XOR buffer contains the XORed parity for moving into the parity disk.

A DMA controls the XOR engine and also may provide additional functionality. For example, the DMA may be used to create a checksum for data being written and to check the checksum of data being read. By operating on the fly, the DMA and the XOR operation are advantageously completed without performance degradation.

Other objects and advantages of the present invention will become apparent during the following description taken in conjunction with the drawings.

DETAILED DESCRIPTION OF THE PRESENTLY PREFERRED EMBODIMENT

Figure 1:
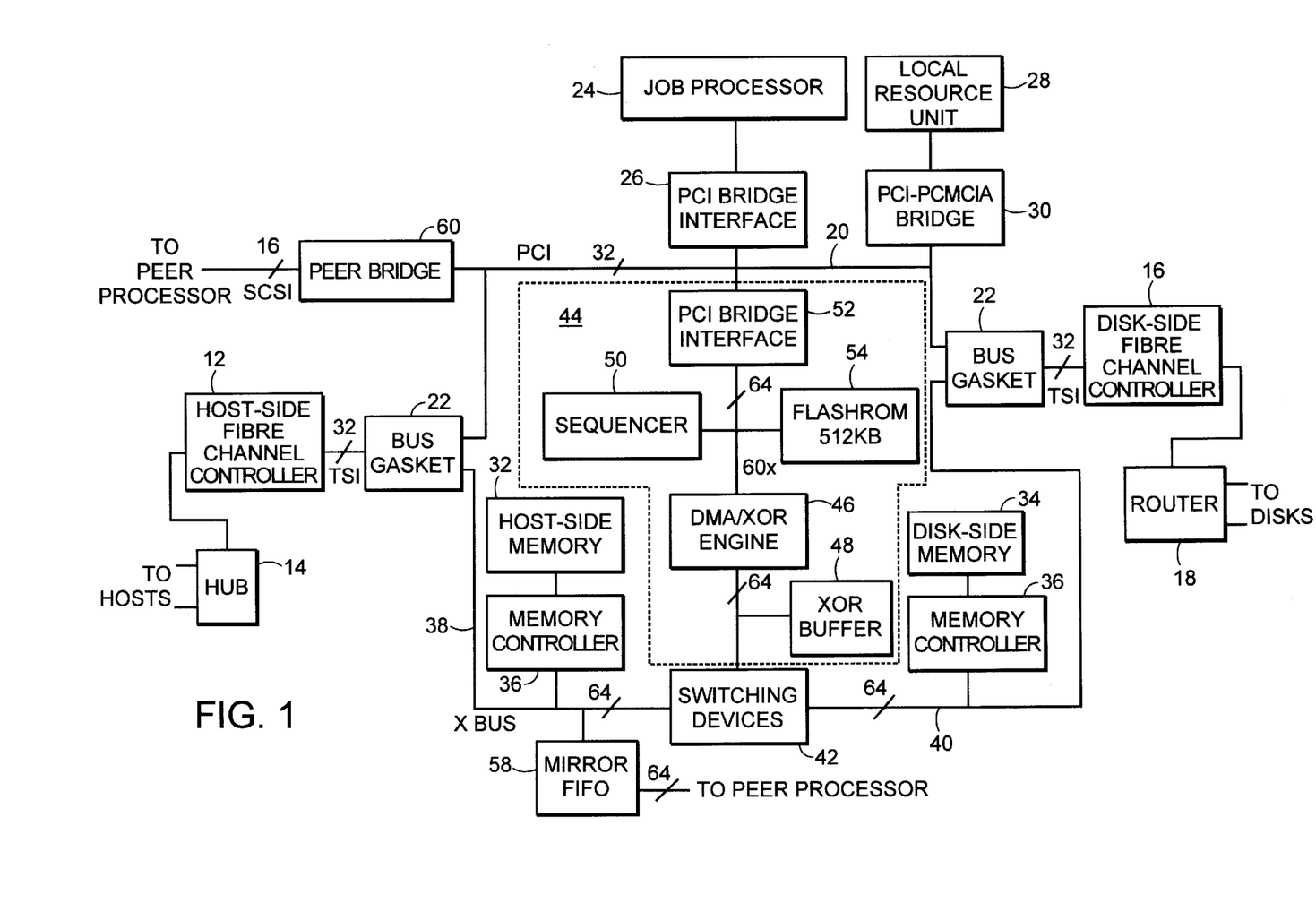
FIG. 1 is a block diagram of a RAID controller including the high performance data path of the present invention.

The high performance data path of the invention shall now be described in the context of the RAID controller shown in FIG. 1. The RAID controller supervises I/O operations between a disk array and the host computers. Data on the disks is arranged according to a RAID algorithm, such as RAID 3 or RAID 5 for example. The RAID controller of the presently preferred embodiment is implemented for use with a fiber channel. A fiber channel protocol has been standardized for system communication with disk arrays. A host-side fiber channel controller 12 is provided at the host end of the RAID controller for interfacing with host computers. A hub 14 allows for more than one host to connect to the host-side fiber channel controller 12. The host-side fiber channel controller in conjunction with driver software, implements the host side Fibre Channel Protocol. The host-side fiber channel controller moves two types of data between itself and an attached memory system, control data and user disk data. Control data has a relatively low bandwidth requirement and user disk data has a relatively high bandwidth requirement. The high performance data path of the present invention is designed to accelerate operations involving user disk data.

Control data consists of control structures, a small amount of FCP data (mode pages, etc.) and fiber channel data (login, etc.). This is all infrequently accessed data. The bandwidth requirement of this data is relatively small and the processor requirement to read and write this data is relatively high. As a result, the control data is all stored in a shared memory system which the job processor 24 also uses for its own operating software. All control data fetches to and from the host-side fiber channel controller 12 and a disk-side fiber channel controller 16 are done through an upper bus 20 which is a standard PCI bus.

Disk data is the data which passes between the host and the disks. There is no need for the job processor 24 to read or write this data. There is a need for this data to be XORed and checksummed. Words of data are XORed with corresponding words in a parity sector to obtain updated parity. A checksum is determined for a sector by XORing together all the disk data words in the sector. The bandwidth requirements of disk data are significant. As a result, the specialized high performance data path of the present invention is intended for use with all disk data movement.

The disk-side fiber channel controller 16, in conjunction with disk side driver software, implements the fiber channel arbitrated loop protocol among the disk arrays. Both the host-side fiber channel controller 12 and the disk-side fiber channel controller 16 have access to the PCI bus 20 and the high performance data path of the present invention.

The host-side fiber channel controller interfaces with host computers, while the disk-side fiber channel controller interfaces with the disk drives. The host-side fiber channel controller and the disk-side channel controller may be conventional fiber controllers such as the Tachyon™ chip manufactured by Hewlett Packard.

The router 18 in the diagram represents the capability of the system to connect the disk-side fiber channel controller 16 to either of the two fiber channel loops that are conventionally present in a fiber channel system. A presently preferred method for connecting to the disk arrays in a fiber channel system is shown in U.S. patent application Ser. No. 08/749,311, filed Nov. 14, 1996 and entitled "Fail-over Switching System" assigned to the same assignee as the present application, the disclosure of which is hereby incorporated by reference herein.

Bus gaskets 22 form an interface between the bus of each of the fiber channel controllers and the PCI bus 20 and the high performance data path of the invention. The PCI bus is connected through a PCI bridge interface 26 with the job processor 24. The PCI bridge interface 26 is required to interface the 32-bit PCI bus with the 64-bit 60X bus used in the job processor 24. The job processor 24 includes a microprocessor. In accordance with the presently preferred embodiment, a Motorola Power PC with 200 MHZ capability is implemented. In order to complete the job processor 24, there is also a level 2 processor cache, a control DRAM and a flashROM. RAID controller firmware relating to power up procedures is found in the flashROM. Firmware in the flashROM executes in the job processor 24. The job processor includes a fixed amount of DRAM which in accordance with the presently preferred embodiment is 8 MB for use by the firmware, the disk cache tracking structures and the control structures for the fiber channel controllers.

A local resource unit 28 is connected to the PCI bus through a PCI-PCMCIA bridge 30. The local resource unit 28 is an environmental monitor. It provides a collection place for control, status and shared resources used by the RAID controller. These resources include communication posts for external console, field replaceable unit status and standby power monitoring.

The high performance data path in the RAID controller shall now be described. Through normal operation of a RAID controller, staging memory is required to account for the asynchronous nature of disk I/O. Logically related operations, but physically separate disk operations often need to be staged while awaiting completion of all disk operations. Thus, a RAID controller should have a staging memory. In accordance with the present invention, a first host-side memory 32 and a second disk-side memory 34 are provided. An advantageous feature of the present invention is that the host-side memory 32 and the disk-side memory 34 may double in function both as staging memories and caching memories. The separate disk-side and host-side caches are able to be placed as close to their sources as possible with the current design. Disk caching algorithms and architectures are well known in the art. The host-side memory and disk-side memory are ECC (Error Correcting Code) protected DRAM DIMMs in accordance with the presently preferred embodiment. The memories are each controlled by a memory controller 36. The high performance data path includes a first bus 38 for connection to the memory controller 36 operating the host-side memory 32. There is also a second bus 40 for connection with the memory controller operating the disk-side memory 34. The first and second buses are selectively connectable by switching devices 42.

The switching devices 42 are also connected to a data path control engine 44. The data path control engine is a combined Direct Memory Access unit (DMA), and an XOR engine. The data path control engine may also include a checksumming engine. The switching devices 42 may connect the first bus, the second bus and the data path control engine together all at once or they may be used to isolate either the host-side memory 32 or the disk-side memory 34 from the others. The data path control engine 44 includes a DMA/XOR engine 46 and an XOR buffer 48. In performing an XOR on data transfers, the first data being passed between the host-side memory and the disk-side memory is copied into the XOR buffer 48. In subsequent data transfers between the two memories, data words are XORed by the DMA/XOR engine with the corresponding data words in the XOR buffer 48. Each time the result of the XORing is replaced into the XOR buffer 48. In performing a write operation to interrelated RAID disks, when all data in a corresponding group has been XORed, the parity data is found in the XOR buffer.

A sequencer 50 is used to control the operation of the DMA/XOR engine 46. The sequencer is a microprocessor which performs a list of instructions. The instructions are provided by the job processor 24. A PCI bridge interface 52 interfaces the 64-bit bus of the sequencer 50 with the 32-bit PCI bus. The sequencer 50 works in conjunction with a flashROM 54 that contains the configuration and power up self-test code for the sequencer 50. The sequencer 50 also instructs the DMA with regard to the state of switching devices 42. The sequencer may be a Motorola Power PC that operates up to 100 MHZ. in accordance with the presently preferred embodiment.

The presently preferred RAID controller is provided with a peer controller. The two controllers are each connected to independent fiber channels under normal operation. A direct SCSI connection between the controllers provides direct communications between the two controllers. A peer bridge 60 facilitates this communication. In order to maintain a highly available write cache in the host-side memory 32, it must be mirrored. Memory inside the peer processor is used to mirror the write cache for each of the RAID controllers. Two dedicated 64-bit data paths are provided between the two peer controllers for use in mirroring the caching data. All write data gets mirrored before writing to a disk. Advantageously, mirroring can take place with the write bus 38 isolated from the read bus 40 so that the read bus can handle other operations during the mirroring process. The mirror data in accordance with the presently preferred embodiment is pushed from one controller to the other. That is, one controller will place data in a mirror FIFO 58 which physically exists on the peer controller. The peer controller will remove the data from its mirror FIFO 58 and place it into its own memory. This approach allows the receiving controller to perform certain validity checks on the address of the data and to construct fire walls between the two boards such that if a first controller were to attempt to write data to a location on the peer controller which it is not authorized to, the first controller will be caught and prevented from causing any damage to the receiving peer controller.

The mirrored cache provides protection in the event of a memory failure or processor failure. In the event of such a failure the host's data remains available in the mirrored cache.

The high performance data path of the invention is for use in conjunction with a disk array in which the data on a group of disks is interrelated. The interrelation involves providing parity in one of the disks. The parity data is an XOR of the data in each of the other disks. The disks are typically striped so that sectors in each of the disks belong to a stripe. Sectors belonging to a stripe are all said herein to correspond to one another. All the data sectors in a stripe are XORed with one another to produce the parity sector for that stripe.

The advantages of the high performance data path of the invention can be better seen in the completion of RAID operations. For example, a RAID 3 read is performed by reading the sector from each disk in a stripe from an interrelated group of disks. Reading from the disks takes place asynchronously. During the reading of data from the disks into the disk-side memory, the switching devices 42 isolate the read bus 40 from the write bus 38 and the data path control engine 44. As the data arrives, it is written into the disk-side memory 34. Thus, the data is staged in the disk-side memory pending completion of the entire read operation. Typically, a RAID 3 read only reads the data sectors in a stripe. One would wait for all of the data sectors in the stripe to be read and written into memory. This may occasionally result in extended delays if one of the disks experiences an error or fails to respond in a timely manner. Also, transition to a degraded mode (in which one of the disk drives is missing) will result in a noticeably longer delay because then parity information and reconstruction will be required. In accordance with the present invention, a mode may be selected in which all of the sectors, including the parity sector, are read, but it is not necessary to wait for the last disk drive to provide its sector of data. Operating in this "N−1 and go" mode, the data from the first N−1 disks (where N is the total number of disks in a group) in the interrelated group is successively moved from the disk-side memory to the host-side memory. To do this, the switching devices 42 interconnect the disk-side memory, the host-side memory and the data path control engine. At the same time the data is being moved from the disk-side memory to the host-side memory, a copy of the data for the first move is copied into or filled into the XOR buffer 48. For each subsequent data sector that is moved from the disk-side memory to the host-side memory, the DMA/XOR engine 46 performs an XOR on that data with the corresponding words of data that is in the XOR buffer 48. The result of the XOR operation is replaced into the XOR buffer. The XORing is successively repeated until all except one of the corresponding sectors in the stripe have been moved. The job processor 24 always knows what data and parity has been received from the disks based on which disk I/O's have completed. This is used in providing the sequencer 50 with its list of operations to perform. If the final missing sector is a data sector, the contents of the XOR buffer 48 is then moved into the host-side memory as it should be equal to the data in the sector that has not yet arrived. If the final missing sector is the parity sector, the contents of the XOR buffer 48 is not needed and the normal RAID 3 moves of the data sectors have been sufficient.

A write operation assisted by the high performance data path operates as follows. The data to be written is written into the host-side memory 32 while the write bus 38 is isolated from the read bus 40 and the data path control engine 44. Thus, the data is staged in the host-side memory pending completion of the write. The host-side memory is switched into connection with the data path control engine and the disk-side memory. Data sectors are moved successively from the host-side memory into the disk-side memory. The first data sector is copied and filled into the XOR buffer 48. For each successive data sector, its data words are XORed in the DMA/XOR engine 46 with corresponding words in the XOR buffer 48 to produce a result that is placed back into the XOR buffer 48. After the last of the data sectors has been XORed, the contents of the XOR buffer 48 is moved to the disk-side memory and will be treated as the parity sector. The data sectors and the parity sector of the stripe are then within the disk-side memory and available for writing into the respective disks under the control of the disk-side fiber channel controller 16. The write to disk may take place with the read bus 40 isolated by the switches 42 from the write bus 38 and the data path control engine 44.

Figure 2:
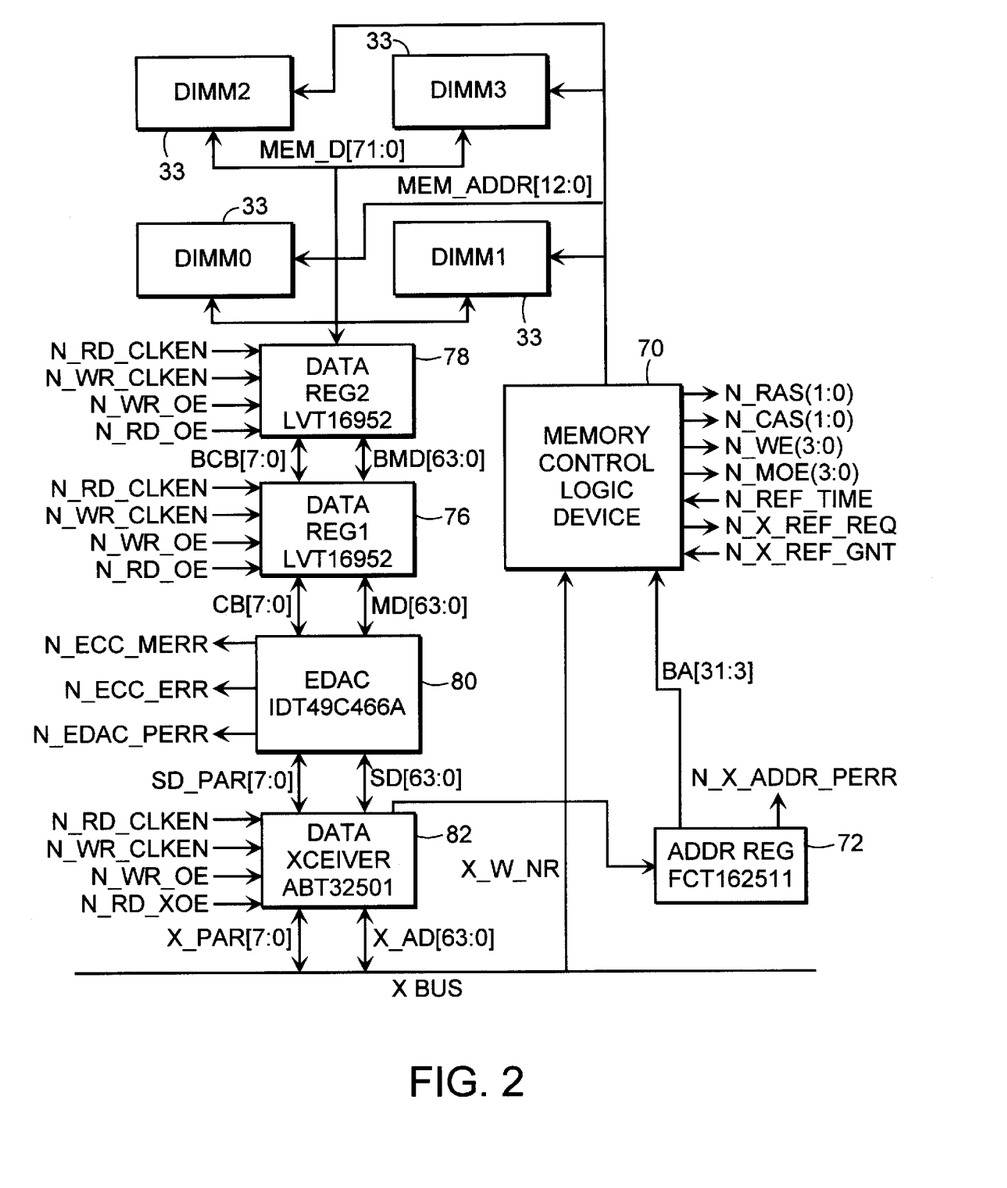
FIG. 2 is a block diagram of the memory controller and memory used with each of the disk-side and host-side memories in the invention of FIG. 1.

The memory controllers 36 for the host-side memory and the disk-side memory may be configured in the same manner as shown in FIG. 2. Although the specific presently preferred implementation is described below, those of ordinary skill in the art may implement any number of memory controllers that accomplish the functions of the invention claimed herein. Conventional memory control techniques are available to be implemented to satisfy the memory control needs of the present invention. The present invention is thus in no way limited by the following discussion of the presently preferred embodiment of the memory controllers. The logic for operating the memory controller of the presently preferred embodiment is contained within a memory control logic device 70. The logic device may be a Complex Programmable Logic Device (CPLD) such as those made by Advanced Micro Devices. The memory control logic device 70 is made up of 3 sections: an address controller, a data path controller and a DIMM controller. The address controller latches addresses and commands off the respective bus. Parity checking is performed on the address. The logic device 70 decodes the address, generates the row and column addresses, increments the CAS (column address strobe) address during burst operations and handles page crossings. The data controller portion of the logic device 70 is responsible for all the data path control and the data valid handshake protocol between an initiator and a target. The DIMM controller portion handles RAS (row address strobe), CAS, WE (write enable), OE (output enable), and refresh for the DRAMS. The DIMM controller contains RAS and CAS state machines. The CAS machine is the only part of the controller that runs at 66 MHz. The remainder of the controller operates at 33 MHZ in the presently preferred embodiment. The address controller of the logic device works in conjunction with an address register 72. The address register consists of two bus transceivers with parity generators/checkers. In the presently preferred embodiment, one of the inputs to the address controller is called N_X_

FRAME. The N_X_FRAME signal is asserted by the current bus master to indicate the beginning and duration of an access. It is deasserted at the beginning of the last data phase. On single beat (8 bytes) operations, it is asserted for one cycle. The word "beat" as used herein refers to a single bus cycle. When the N_X_FRAME signal is latched, the latch is closed, the next cycle. The latch is reopened when the operation is complete. Odd byte parity is checked on each address, and is valid the cycle after N_X_FRAME is asserted. A read/write bit, X_W_NR, is asserted with N_X_FRAME for one cycle during the address phase. Another similar bit in the presently preferred embodiment is entitled EDAC_CMD. The EDAC bit defines the operation as an EDAC mode register write for power up configuration or an EDAC diagnostic register read. Both of these signals are valid in the first cycle that the N_X_FRAME is asserted.

The Xbus address bus X_AD is time multiplexed with the least significant 32 bits of data. It is asserted with N_X_FRAME for one cycle. The address parity pins X_PAR are odd byte parity. They are asserted with N_X_FRAME for one cycle. Bit 3:0 contains address parity for X_AD. Addresses are checked for odd byte parity when they are latched into the address register the cycle after N_X_FRAME is asserted. If there is an odd byte parity error, the address register 72 sets the address parity error flag N_X_ADDR_PERR in the cycle after N_X_FRAME is asserted. The bus address BA is accessed by the logic device 70 from the address register 72. The address register is given an address for beginning a memory access, and that address is incremented until the access is completed.

Further, with regard to the address controller, in order to allow bursting up to 65 beats (520 bytes), the column address has an incrementer. When a DRAM page crossing (8 bytes boundary when row address must be incremented) is detected, an incremented row address is generated while N_RAS is being precharged. N_RAS is the row address strobe for DIMMs 33. It is asserted two cycles after N_X_FRAME and deasserted the cycle after the CAS state machine goes idle. On a page crossing, it is deasserted for precharge while the new row address is being generated. N_CAS is the column address strobe for the DIMMs 33. It is asserted for a half a 33 MHZ cycle and is driven by a 66 MHz clock. During wait states, it is held in precharge (deasserted). The presently preferred embodiment is configured to support a page size independent of DRAM size. In the preferred embodiment, the memory design transparently supports page crossings to allow synchronized data transfers between the read and disk-side and host-side memories. Thus, there is no need for additional wait states during page crossings.

The disk-side and host-side memories of the presently preferred invention are inserted into noninterleaved DIMM sockets. Using 16 and 64 Mbit DRAMS, the memory of a desired size can be configured. In the presently preferred embodiment, the DIMM socket is voltage keyed, so that only 3.3 volt DRAMS can be inserted into the socket. The DIMMs 33 preferably use 74 LVT 16244's to buffer the address and all control signals except N_RAS. There are decoupling capacitors mounted beside each DRAM.

The DIMM controller of the logic device 70 includes a RAS and a CAS state machine. The RAS state machine is the master state machine that handles both refresh and read/write accesses. On a read/write operation, N_RAS is asserted three cycles after N_X_FRAME is asserted and remains asserted until the CAS state machine returns to idle. During a page crossing, the RAS state machine cycles back through idle in order to precharge N_RAS while the new row address is being generated. For a CBR (CAS before RAS) refresh, the RAS machine kicks off the CAS state machine and then asserts N_RAS a cycle after N_CAS is asserted.

The CAS state machine runs off of a 66 MHZ clock and is triggered by the RAS state machine. During read/write accesses, N_CAS is asserted for 15 ns, and then precharged for 15 ns. If wait states are asserted by the master, or a page crossing occurs, N_CAS remains in precharge. Once the CAS state machine is kicked off, it syncs up with a 33 MHZ clock signal, so that N_CAS is always asserted on the positive edge of the 66 MHZ clock signal which aligns with the positive edge of the 33 MHZ clock signal. This way the machine only samples 33 MHZ signals in the second half of the 30 ns cycle. Each of the DIMMs has separate enable signals indicated by N_WE(3:0) and N_MOE(3:0). The output enable, N_MOE, is asserted in the same cycle as N_RAS on reads and for as long as N RAS is asserted unless there is a page crossing. During a page crossing, the output enable signals are switched while N_RAS is precharging. The write enable signal N_WE is handled in the same way. It is asserted in the same cycle as N_RAS on writes, for as long as N_RAS is asserted unless there is a page crossing.

A timer in the local resource unit (LRU) 28 will assert N_REF_TIME every 15.4 μs. The logic device 70 includes a refresh state machine that will assert N_X_REF_REQ in the following cycle to request a refresh cycle, regardless of the current state of the controller. It is up to an arbiter programmed into a CPLD to not grant the refresh until the Xbus is idle. Upon receiving N_X_REF_GNT, a CBR refresh cycle is kicked off by the RAS and the CAS state machines. The disk-side and host-side memories are refreshed simultaneously. N_X_REF_REQ remains asserted until the refresh is complete. This will let the arbiter know when the Xbus is free. The arbiter will not grant the bus to anyone else during refresh.

The data path controller of the logic device 70 controls a first data register 76, a second data register 78, an error detection and correction device 80 and a data transceiver 82 and the data valid handshake interface protocol to the Xbus. On a read, data is clocked into the second data register 78 from the enabled DIMM. In order to use the EDAC 80 in flow-through mode, the data is then clocked into the first data register 76 on the positive edge of the 33 MHZ clock. There is a full cycle to get through the EDAC 80 and make setup into the data transceiver 82. The EDAC 80 does ECC detection and correction on the fly and generates odd byte parity for the Xbus. Data is driven onto the Xbus in the next cycle. N_RD_XOE is the output enable of the data transceiver. The EDAC checks the parity and generates ECC check bits. The next cycle, data is clocked into the second data register 78 and in the subsequent cycle, data is written into the appropriate DIMM.

A pre-target-ready signal is used to aid the DMA 66 in controlling the initiator ready signals between the disk-side and host-side memories during a page crossing. The pre-target-ready signal suspends the data transfer while the memory prepares to cross a page boundary. When a read operation is ongoing, the pre-target-ready signal is asserted the cycle before data is valid on the Xbus. For moves between the write and read memories, this allows the DMA controller to assert an initiator ready signal to the target of the read the following cycle. The next cycle a target ready signal is asserted until the cycle after N_X_FRAME is deasserted. (On single beat operations, it is just asserted for one cycle if the initiator ready signal is also asserted.)

For a write operation, the pre-target ready signal is asserted the cycle before it is ready to accept data from the Xbus. For moves between write and read memories, this allows the DMA to assert the initiator ready signal to the source of the write in the following cycle. Assertion and deassertion of the target ready signal is the same as for reads.

The EDAC 80 of the presently preferred embodiment is an IDT49C466A. It is a 64-bit flow-through error detection and correction unit. It uses a modified Hamming code to correct all single bit hard and soft errors and detect all double bit and some multiple bit errors. The flow-through architecture, with separate system and memory buses, allows for a pipeline data path.

Figure 3:
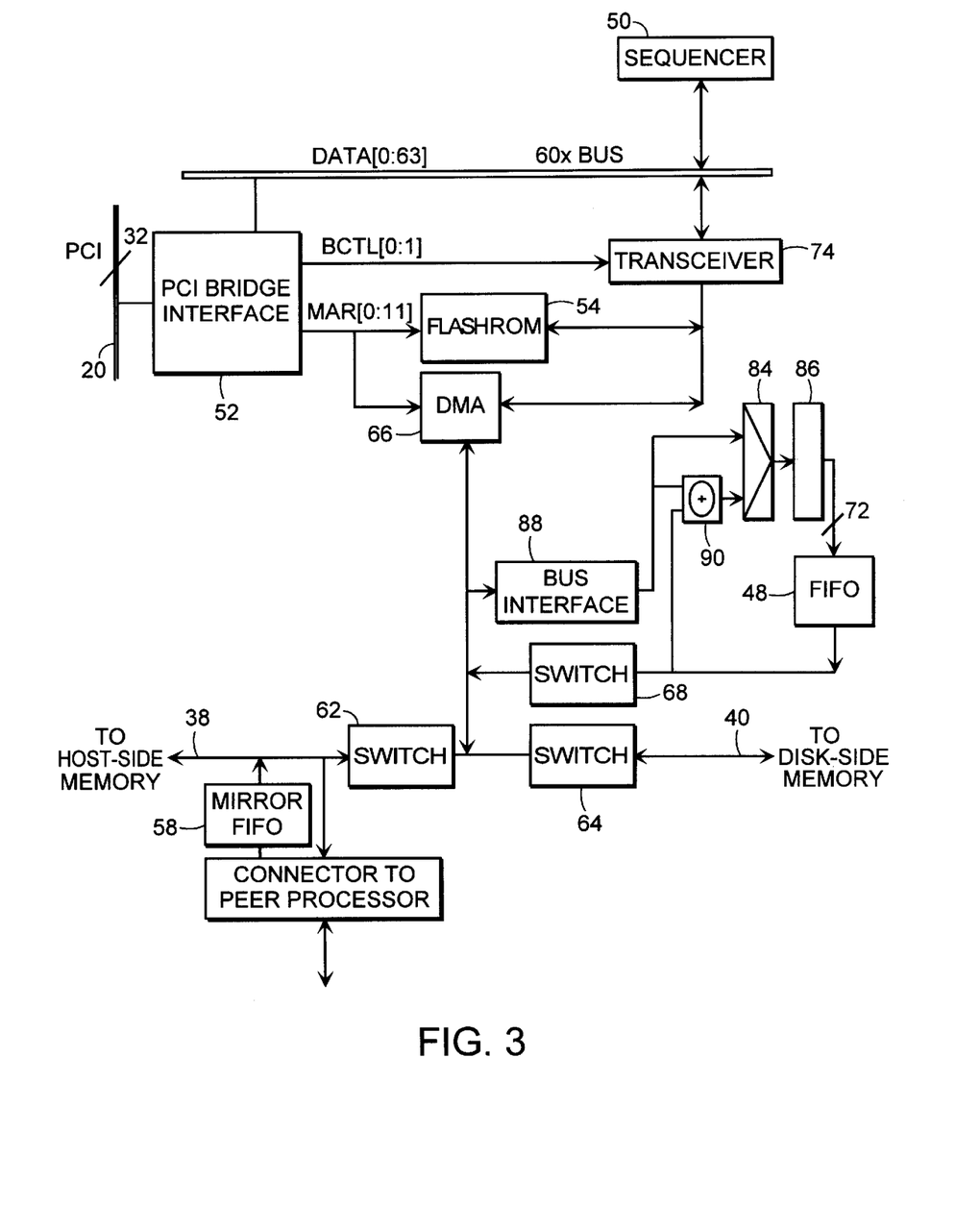
FIG. 3 is a block diagram of a data path control engine for use in the high performance data path of the present invention.

Referring now to FIG. 3, the operation of the DMA/XOR engine shall be described with more particularity. The DMA/XOR engine consists of two subunits. The first is a data engine and the second is an XOR engine. The data engine is responsible for generating/checking the checksum and for moving data between the disk-side and host-side memories, from the host-side memory to the mirror FIFO 58, from the XOR buffer 48 to the disk-side and host-side memories, from the disk-side and host-side memories to the XOR buffer 48 and immediate data moves to and from either of the disk-side or hostside memories, the XOR buffer or the mirror FIFO 58. Immediate data moves are precoded pre-determined moves of a constant number value (no address needed to define the number). The data engine also monitors the status of the second peer processor mirror FIFO 58. If there is data in the mirror FIFO 58, the DMA 66 will contain a status bit depicting it. Once the peer sequencer has moved its mirrored data into its host-side memory, it will signal to the DMA sequencer that it was finished and that no error has occurred during the transfer.

The second unit of the DMA/XOR engine is the XOR engine which generates RAID parity data, checks the RAID 3 parity data and checks for hardware bus (data and address path) parity errors from the disk-side and host-side memories. The XOR engine is made up of programmable logic devices and the XOR buffer 48. The XOR engine will return RAID data status to the data engine and hardware parity errors to the local resource unit (LRU) 28.

The switching devices 42 are implemented as three separate switches. A first switch 62 may be used to isolate the write bus 38 from the read bus 40 and the data path control engine 44. A second switch 64 may be used to isolate the read bus 40 from the write bus 38 and the data path control engine 44. A third switch 68 is connected to receive the output of the XOR buffer 48. The third switch 68 allows the results in the XOR buffer 48 to be loaded onto the read or write bus depending on the state of the other two switches. The switches in a presently preferred embodiment are implemented by crossbar switches, in particular, CBT16212 switches. The state of the switches is controlled by the DMA 66. The status of the switches may be controlled to connect all of the read bus 40, write bus 38 and the data path control engine 44 together. Alternatively, the switches may be controlled to isolate one or more of these data paths from the others.

The DMA 66 is programmed by the sequencer 50 and returns status to the sequencer when it has completed its task. The sequencer 50 communicates with the flashROM 54 and DMA 66 through a transceiver 74. The transceiver 74 provides a buffering path from the sequencer to registers in the DMA. The sequencer reads and writes to the DMA registers. The sequencer 50 uses the program in the flashROM 54 to boot up.

The DMA 66 communicates in the form of read/write operations to either the diskside or host-side memories, the mirror FIFO or the XOR engine. For every sector move, the data engine will automatically generate or check the checksum of that data. The checksum will also be generated any time the XOR buffer 48 is being unloaded. To start the checksumming process, a bit ("sector begin" bit) is set to indicate the beginning of the sector transfer. The setting of this bit will cause the checksum logic to XOR the contents of a checksum seed with the first piece of data. If this bit is not set, then the first piece of data is XORed with the contents of the checksum register. The sector begin bit will allow for variability in the sector's size without modifying the checksum logic. Any time the register set of status bits is read, the calculated checksum will be returned to the sequencer. In connection with the generation of a checksum, the propagation of data is suspended whenever a checksum is generated and merged onto the data bus. The cycle is used to turn around the data bus and to finish up the generation of the checksum.

The DMA includes a CMD/status register with five fields. A first field tells the DMA whether the operation is a data movement that involves a disk-side or host-side memory or whether it is a read/write of immediate data, i.e., a single beat (8 bytes) of data. For data moves, the data source must be specified by the source field of the CMD/status register with the source address in the source register. When the source is the XOR buffer 48, the XOR engine will unload the data and at the same time refill itself with the same data. This allows RAID 3 reconstructed data to stay in the XOR buffer 48 so it can be checked against the final piece of data. Once the last piece of the sector comes in that can be checked by setting a check parity data bit of CMD/status register. The destination must also be indicated by setting the destination field in the CMD/status and its address in the destination register. The amount of data to be transferred is indicated by the word count field.

The flashROM 54 is used to store boot codes. The flashROM of the presently preferred embodiment is a 512KB×8 and will reside on the most significant byte lane of the data bus.

The DMA engine always acts as an initiator and always is responsible for driving the initiator ready signal even when it is not sourcing the data. The disk-side and hostside memory and the mirror FIFO will always be targets. The write bus 38 and the read bus 40 will each have its own interface control signals even when the buses are joined together. At the beginning of moves between the disk-side and host-side memories, the DMA synchronizes data flow between the two memory systems. DMA will handshake with the memories through the initiator ready and the pre-target-ready signal signals. When a memory is ready to receive or send data, it will assert the pre-target-ready signal one cycle before the data is valid. In response, the DMA will assert the initiator ready signal. When both memories are being used in the transfer, the DMA will not assert the initiator ready signal to the memories until it has received both pre-target-ready signals. Once it has received both of these signals, it will assert the initiator ready signal at the same time. At this time, the data is considered valid on the Xbus, i.e., the read and write busses.

In accordance with the presently preferred embodiment, other validity checking mechanisms besides the checksum are also used. A time stamp is a unique number that is located in a validity field of each data sector. The unique number is inserted in each sector in a RAID group during a major stripe update. A major stripe update refers to writing data filling every sector in a RAID stripe. If data is written into a sector thereafter, then the time stamp is invalidated. A new time stamp is inserted at the next stripe update. A write stamp provides a bit for each disk in a group. When a write is made to a disk the value of the bit for that disk is flipped, i.e., changed from a 1 to a 0 or from a 0 to a 1 depending on whichever is its current value. In order to accommodate the write and time stamp information of the presently preferred embodiment, the DMA will only suspend an operation at the end of the data transfer in order to append the checksum and the stamp information. At that time, the initiator ready signal will be deasserted for one cycle and then asserted for one cycle when the 8 bytes including stamp information from the DMA and checksum information from the XOR engine are on the bus. The one cycle delay is needed in order to complete the generation of the checksum. In the opposite direction as data is moved from the disk-side memory to the host-side memory, the stamp information is stripped off and placed in stamp registers in the DMA. The stamp information is not sent to the host-side memory. Thus, in accordance with the presently preferred embodiment, the host-side memory stores 512 bytes for each sector and the disk-side memory stores 520 bytes per sector.

The preferred XOR buffer 48 is a FIFO. The FIFO 48 holds one sector. The FIFO 48 can be loaded from one of three paths. The choice of paths is switched by operation of a multiplexor 84 which may be separated from the FIFO 48 by a buffer 86. The first is with data directly from the data bus. A bus interface 88 removes data from the bus for use in the XOR engine. Data is registered externally and parity checked before it is written to the FIFO. A second path is a feedback path from the FIFO into itself. This is needed in order to maintain a copy in the FIFO while unloading the FIFO data onto the bus. The final logical path into the FIFO is the XOR path. The XOR logic 90 exclusive ORs the registered data from the bus with the contents of the FIFO. The result of the XOR is input to the FIFO 48 behind the old data as the old data is sequentially output to the exclusive OR logic. The existing data is thus replaced by the exclusive OR results. The selection of the needed path is done by the sequencer by setting the appropriate bits in the CMD/status register. Whenever the XOR FIFO is being unloaded, the DMA logic can be programmed to append the generated checksum and the write and time stamp information found in the DMA register sets.

The XOR engine can advantageously be used to detect RAID 3 user data parity errors. During a RAID 3 reconstruct operation, the XOR engine can be programmed through the DMA to reconstruct the final piece of data. When the data has been regenerated, it can be unloaded from the FIFO buffer 48 to the host-side memory. If the new data is to be compared to the old data, then during the unload operation, the check parity data bit can be set. This allows the new data that is being read from the XOR FIFO to be written back into the FIFO buffer 48. The old data when it comes in can then be compared to the new data by setting this bit with an XOR FIFO operation. If there is a mismatch between the old and new data, the check sum error bit will be set in the CMD/status register. Note that during the compare, the XOR FIFO will not be reloaded.

Figure 4:
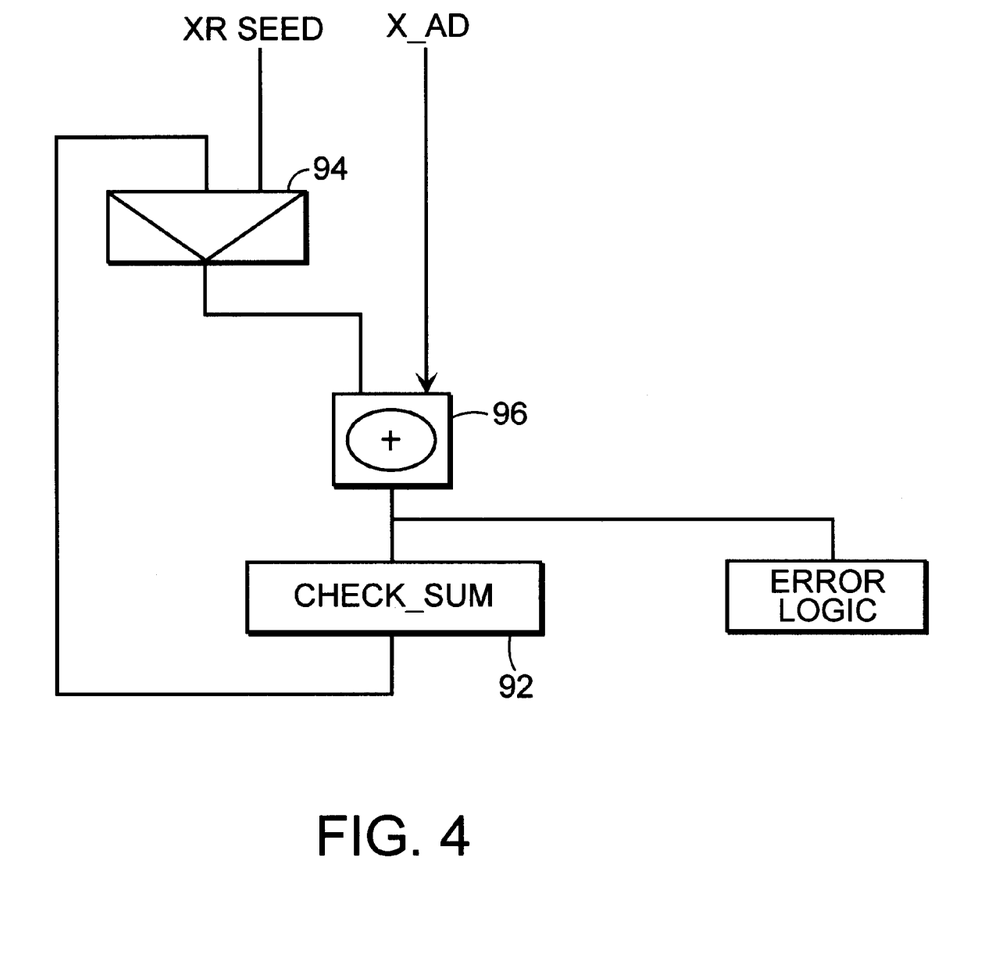
FIG. 4 is a block diagram of the DMA logic for including in the data path control engine of FIG. 3.

FIG. 4 illustrates the DMA logic for performing the checksum on the fly. A check sum buffer 92 holds the checksum data as it is being computed. A multiplexor 94 feeds the checksum XOR logic 96 with either the data in the checksum buffer 92 or an initial seed data found in a DMA register. The other input to the XOR logic 96 is the data being checksummed.

The high performance data path of the present invention permits an "N–1 and go" mode for performing RAID read operations. If one of the drives is struggling or not operating, N–1 and go mode can maintain a fairly constant transfer rate to the host. While N–1 and go is quicker for situations where a drive is struggling or not operational, the mode is also slower than normal operation. Under normal condition, the N–1 and go operation is slower because there is an added latency for handling the XOR operation and there is one extra request from the disk-side fiber loop. Instead of requesting data from the data sectors only, the parity sector is also requested. The advantage of this mode is that the through-put is more deterministic. For applications where this is of great importance, the reduction in speed for normal operation is an acceptable tradeoff.

Of course, it should be understood that various changes and modifications to the preferred embodiment described will be apparent to those skilled in the art. Such changes could be made without departing from the spirit and the scope of the invention and without diminishing its attendant advantages. It is therefore intended that such changes and modifications be covered by the following claims.

We claim:

1. A high performance data path comprising:

a first bus;

a switch connected to said first bus;

a second bus connected to said switch, said second bus selectively joined to said first bus through said switch to form a single extended bus comprised of said first bus and said second bus;

a first memory on said first bus;

a second memory on said second bus; and an XOR engine switchably connectable to said first and second buses to accomplish successive XORing of corresponding data passed between said first and second memories along the extended bus so as to produce a result of said XORing;

wherein said switch connected to said first bus permits isolating said first bus from said second bus and said XOR engine so that the result of said XORing may be passed to said second bus without being concurrently passed on said first bus.

2. The data path of claim 1 further comprising a buffer switchably connected to receive data passed between said first and second memories and connected to said XOR engine to replace data in said buffer with a result from said XOR engine of XORing data passed between said first and second memories with the data in said buffer.

3. The data path of claim 2 wherein said buffer comprises a FIFO.

4. The data path of claim 1 wherein said data path is for use with a host and further comprises an interface, coupled to said first bus, that interfaces said first bus with the host.

5. The data path of claim 1 wherein said data path is for use with a disk array and further comprises an interface, coupled to said second bus, that interfaces said second bus with the disk array.

6. The data path of claim 4 wherein said first memory stages data for writes and functions as a cache.

7. The data path of claim 5 wherein said second memory stages data retrieved during a read and functions as a cache.

8. The data path of claim 1 wherein said switch connected to said second bus permits isolating said second bus from said first bus and said XOR engine.

9. A high performance data path comprising:

a first bus;

a second bus;

a switch connected to said first bus and said second bus to selectively join said first bus to said second bus to form a single extended bus comprised of said first bus and said second bus;

a first memory on said first bus;

a second memory on said second bus;

a FIFO switchably connectable to said first bus and said second bus; and

XOR logic coupled to said FIFO and switchably connectable to said first and second buses to permit XORing of data passed between said first and second memories along said single extended bus with data in said FIFO and placing a result of said XORing into said FIFO;

wherein said switch connected to said first bus permits isolating said first bus from said second bus and said XOR logic so that the result of said XORing may be passed to said second bus without being concurrently passed on said first bus.

10. The data path of claim 9 wherein said data path of for use with a host and further comprises an interface coupled to said first bus, that interfaces said first bus with the host.

11. The data path of claim 10 wherein said first memory stages data for writes and functions as a cache.

12. The data path of claim 9 wherein said data path is for use with a disk array and further comprises an interface coupled to said second bus, that interfaces said second bus with the disk array.

13. The data path of claim 12 wherein said second memory stages data retrieved during a read and functions as a cache.

14. The data path of claim 9 wherein said switch connected to said second bus permits isolating said second bus from said first bus and said XOR logic.

15. A method for performing a read from a group of interrelated disks where a sector of data in one of the disks corresponds with a sector in each of the other disks in the group, the method comprising the steps of:

reading corresponding sectors on at least all but one disk in the group of disks;

writing data from the corresponding sectors in the at least all but one disks into a disk-side memory;

successively moving the data of the corresponding sectors from the disk-side memory into a host-side memory;

filling a copy of the data of a first of the corresponding sectors from the disk-side memory into a FIFO;

successively XORing, in an XOR engine, data from sectors corresponding to the first of the corresponding sectors from the disk-side memory with the corresponding data in the FIFO and replacing the data in the FIFO with results from the XORing until all the corresponding sectors in the group except one has been XORed; and then moving the data in the FIFO into the host-side memory.

16. The method of claim 15 wherein the step of filling the copy of the data of the first of the corresponding sectors occurs synchronously with moving the data of the first of the corresponding sectors from the disk-side memory into the host-side memory.

17. A method for generating a parity sector comprising:

(a) moving a first data sector from a host-side memory on a write bus into a FIFO switched into connection with the write bus and along a read bus joined to the write bus into a disk-side memory;

(b) successively moving data sectors corresponding to the first data sector from the host-side memory to the disk-side memory over the joined write bus and read bus;

(c) performing an XOR in the XOR engine of data in the FIFO with corresponding data moved from the host-side memory and replacing the data in the FIFO with results from said XOR;

(d) successively performing step (c) until all the corresponding sectors have been XORed with data in the FIFO;

(e) moving the data from the FIFO to the disk-side memory, said data constituting the parity sector;

(f) writing the corresponding data sectors and parity sector from the disk-side memory onto a group of interrelated disks wherein each of said disks receives one of the sectors from among the corresponding data sectors and parity sector; and (g) switching to isolate the disk-side memory from the host-side memory and the XOR engine before the step of writing.

18. A high performance data path for use with a disk array comprising:

a first bus;

a switch connected to said first bus;

a second bus connected to said switch, said second bus selectively joined to said first bus through said switch to form a single extended bus comprised of said first bus and said second bus;

a first memory coupled to said first bus;

a second memory on said second bus;

a buffer;

an XOR engine coupled to said buffer and switchably connectable to said first and second buses to permit XORing of data passed between said first and second memories along said single extended bus with data in said buffer and placing a result of said XORing into said buffer; and an interface connected to said second bus, that interfaces said second bus with the disk array;

wherein said switch connected to said first bus permits isolating said first bus from said second bus and said XOR engine after said data is passed between said first and second memories.

19. The data path of claim 18 wherein said buffer comprises a FIFO.

20. The data path of claim 18 wherein said data path is for use with a host and further comprises an interface, coupled to said first bus, that interfaces said first bus with the host.

21. The data path of claim 20 wherein said first memory stages data for writes and functions as a cache.

22. The data path of claim 18 wherein said second memory stages data retrieved during a read and functions as a cache.

23. The data path of claim 22 wherein said switch connected to said second bus permits isolating said second bus from said first bus and said XOR engine.

24. A high performance data path comprising:

a first bus;

a second bus;

a switch connected to said first bus and said second bus to selectively join said first bus to said second bus to form a single extended bus comprised of said first bus and said second bus;

a first random access memory formed in an integrated circuit coupled to said first bus;

a second random access memory formed in an integrated circuit coupled to said second bus; and an XOR engine switchably connectable to said first and second buses to accomplish successive XORing of corresponding data passed between said first and second memories along said single extended bus so as to produce a result of said XORing;

wherein said switch connected to said first bus permits isolating said first bus from said second bus and said XOR engine after said data is passed between said first and second memories.

25. The data path of claim 24 further comprising a buffer switchably connected to receive data passed between said first and second memories and connected to said XOR engine to replace data in said buffer with a result from said XOR engine of XORing data passed between said first and second memories with the data in said buffer.

26. The data path of claim 25 wherein said buffer comprises a FIFO.

27. The data path of claim 24 wherein said data path is for use with a host and further comprises an interface, coupled to said first bus, that interfaces said first bus with the host.

28. The data path of claim 19 wherein said first memory stages data for writes and functions as a cache.

29. The data path of claim 24 wherein said data path is for use with a disk array and further comprises an interface, coupled to said second bus, that interfaces said second bus with the disk array.

30. The data path of claim 29 wherein said second memory stages data retrieved during a read and functions as a cache.

31. The data path of claim 24 wherein said switch connected to said second bus permits isolating said second bus from said first bus and said XOR engine.

* * * * *